UNITED STATES PATENT OFFICE.

RAYMOND J. NESTELL, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

UTILIZATION OF CEMENT-KILN DUST.

1,307,920.     Specification of Letters Patent.     Patented June 24, 1919.

No Drawing.     Application filed January 15, 1917. Serial No. 142,552.

*To all whom it may concern:*

Be it known that I, RAYMOND J. NESTELL, a citizen of the United States, residing in Los Angeles, county of Los Angeles, State of California, have invented a new and useful Process for Utilization of Cement-Kiln Dust, of which the following is a specification.

This invention relates to the treatment of dust collected from the flue gases of cement burning kilns by electrical precipitation or otherwise. This material, on account of its potash content, has found considerable application as a crude fertilizer. The percentage of potash runs as high as thirteen (13%) per cent. $K_2O$, which, in some cases, is nearly all in water soluble form, rendering it readily available for plant assimilation. There has been one objection to its use, however, this being the amount of free caustic alkali which it contains, mainly in the form of free lime.

In order to improve this material for use as a fertilizer, I provide for overcoming this alkalinity by treatment with a reagent capable of combining with the free lime so as to convert it into an inert and almost neutral calcium carbonate. As a neutralizing agent, I prefer to use carbon dioxid.

My process may be carried out as follows:—

The cement dust which is produced as precipitate, for example, in electrical precipitators, which collect the dust from the flue gases of Portland cement kilns, is brought into proper condition for neutralization by mixing with sufficient water to form a fluid or semi-fluid mass. Carbon dioxid is then forced into and through this mass until neutralization is effected. The carbon dioxid for this purpose is preferably obtained from the kiln gases themselves and for this purpose, such kiln gases are forced through the body of liquid by any suitable means. The water which has been added to the material is then evaporated, for example, by utilizing the waste heat from the kilns and the material is then in suitable condition for shipping and for fertilizer use. Any suitable apparatus may be used for carrying out this process, all that is required being a tank for mixing the material with water, means for forcing the flue or kiln gases through the body of liquid and material to be treated and means for evaporating the water, and the process may be advantageously carried out by passing the flue gases through the body of water and material to be treated in such manner that the flue gases furnish the carbon dioxid required for neutralization of the lime and also furnish the heat required for evaporation, the flue gases being forced through the body of liquid and material until the water is evaporated to the required extent.

What I claim is:

1. The process of treating cement kiln dust which consists in mixing the same with water, passing carbon dioxid into the resulting mixture, so as to maintain the mixture in contact with the carbon dioxid for a sufficient time to substantially neutralize the free lime in the kiln dust, and then evaporating to remove water therefrom.

2. The process of treating cement kiln dust containing potassium compound and free lime, which consists in mixing said kiln dust with water, and passing hot kiln gases containing carbon dioxid through the mixture of kiln dust and water in such manner and for sufficient time to increase the solubility of the potassium compound present, to carbonate any free lime present and to evaporate the water by the heat of said kiln gases.

In testimony whereof I have hereunto set my hand, at Los Angeles, California, this 5th day of January 1917.

RAYMOND J. NESTELL.

Copies of this patent may be obtained for five cents each, by addressing the "Commissioner of Patents, Washington, D. C."